(12) United States Patent
Busch

(10) Patent No.: US 6,531,940 B1
(45) Date of Patent: Mar. 11, 2003

(54) COMBINED CONTACTOR/SOFT STARTER

(75) Inventor: Klaus Busch, Amberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/049,376

(22) PCT Filed: Aug. 11, 2000

(86) PCT No.: PCT/DE00/02709

§ 371 (c)(1),
(2), (4) Date: Feb. 12, 2002

(87) PCT Pub. No.: WO01/13506

PCT Pub. Date: Feb. 22, 2001

(30) Foreign Application Priority Data

Aug. 12, 1999 (DE) .......... 199 38 113

(51) Int. Cl.⁷ .......... H01H 67/02
(52) U.S. Cl. .......... 335/132
(58) Field of Search .......... 335/106, 127, 335/132; 318/778–797

(56) References Cited

U.S. PATENT DOCUMENTS 3,988,709 A  10/1976  McKinnon et al. .......... 338/57
6,087,800 A * 7/2000  Becker et al. .......... 318/370

FOREIGN PATENT DOCUMENTS

| DE | 35 26 803 A1 | 1/1987 |
| DE | 43 32 068 A1 | 3/1994 |
| DE | 196 27 295 A1 | 6/1997 |
| DE | 197 13 857 C1 | 4/1998 |
| EP | 0 088 200 | 9/1983 |
| EP | 0 375 261 A1 | 6/1990 |

* cited by examiner

*Primary Examiner*—Ramon M. Barrera
(74) *Attorney, Agent, or Firm*—Harness, Dickey & Pierce PLC

(57) ABSTRACT

A combination includes a contactor and a soft starter. The soft starter is mounted on the contactor.

20 Claims, 4 Drawing Sheets

COMBINED CONTACTOR/SOFT STARTER

This application is the national phase under 35 U.S.C. §371 of PCT International Application No. PCT/DE00/02709 which has an International filing date of Aug. 11, 2000, which designated the United States of America, the entire contents of which are hereby incorporated by reference.

FIELD OF THE INVENTION

The present invention generally relates to a combination of a contactor and a soft starter.

BACKGROUND OF THE INVENTION

In electrical drive technology, electronic soft starters are often used in addition to contactor control in order to protect motors and mechanical drive elements, such as transmissions or pulley belts. A further advantage of using these soft starters is that it reduces the current surges when starting three-phase motors.

The known soft starters are autonomous appliances, which are mounted separately in switchgear cabinets. The connection to the other switching devices (contactor, circuit breaker, overload relay) for a motor outgoer is provided by electrical cables.

One important cost criterion for the user is the space requirement for the switching devices for a motor outgoer in the switchgear cabinet. In this case, width is an important criterion.

SUMMARY OF THE INVENTION

An object of an embodiment of the present invention is to arrange the switching devices for a motor outgoer in a minimal area in a switchgear cabinet.

Such an object is achieved by a soft starter mounted on the contactor.

Such a configuration results in the soft starter and contactor forming a physical unit, which requires only the same width as the contactor.

The soft starter can be mounted on the contactor, for example, by the contactor having a mounting face and an operating face which is opposite the mounting face. In this case the contactor can be mounted by the mounting face on a holding element, and the soft starter can be arranged on the operating face of the contactor.

The contactor can be connected to the soft starter particularly easily if the contactor and the soft starter include interacting hook elements, by which the soft starter can be held on the contactor.

If the contactor and the soft starter include interacting latching elements which, when operated, allow the soft starter to be detached from the contactor, the soft starter can easily be detached from the contactor once again.

If the contactor and the soft starter include interacting supply contact elements, by which the soft starter can be supplied with electrical power via the contactor, no dedicated cables need be laid to supply power to the soft starter.

If the contactor and the soft starter include interacting load contact elements, by which at least one load current cable is connected from the contactor to the soft starter, there is no need either to lay dedicated load cables between the contactor and the soft starter.

If the contactor connects a three-phase power supply system to a three-phase load and the soft starter is a single-phase soft starter, by which only one phase of the three-phase power supply system can be influenced, the wiring complexity when using separately laid load cables can be minimized if the phase which can be influenced is connected via the soft starter to the three-phase load and the two other phases are connected directly via the contactor to the three-phase load.

If the contactor includes a physical contactor width, the soft starter includes a physical soft starter width. Further, if the physical contactor width is at least as great as the physical soft starter width, the soft starter does not project beyond the contactor at the sides.

If the contactor includes a physical contactor height, the soft starter includes a physical soft starter height. Further, if the physical contactor height is greater than the physical soft starter height, the cables can easily be connected to the contactor, even if the soft starter is already fitted.

BRIEF DESCRIPTION OF THE DRAWINGS

Further advantages and details result from the following description of an exemplary embodiment. In this case, illustrated in outline form.

DETAILED DESCRIPTION OF THE PREFERRED EMBODIMENTS

Figure 1:
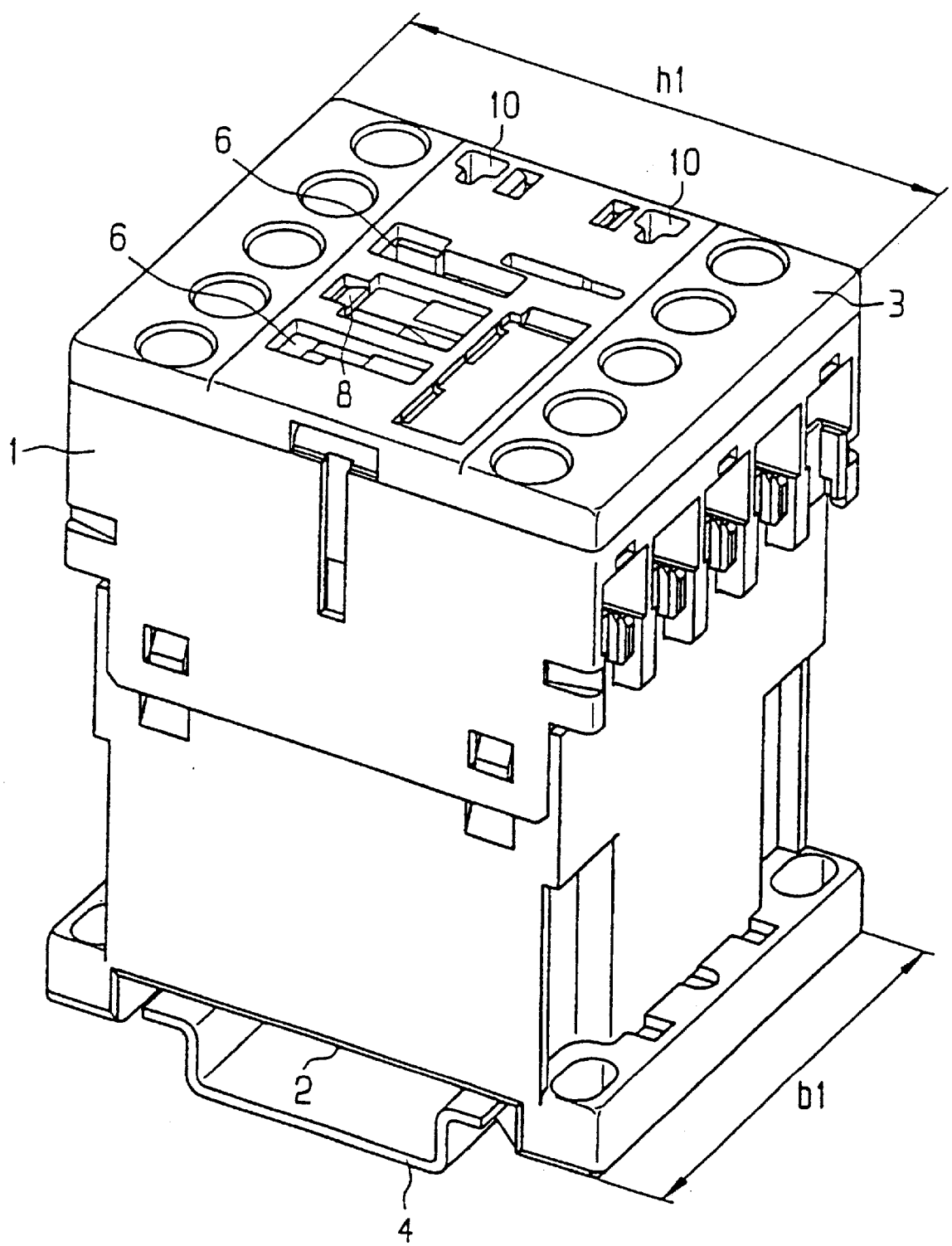
FIG. 1 shows a contactor mounted on a holding element.

As shown in an embodiment of FIG. 1, the contactor 1 includes a mounting face 2 and an operating face 3. The operating face 3 is opposite the mounting face 2. The contactor can be mounted by the mounting face 2 on a holding element 4, in this case a mounting rail 4. The contactor 1 includes a physical contactor width bI, and a physical contactor height h1.

Figure 2:
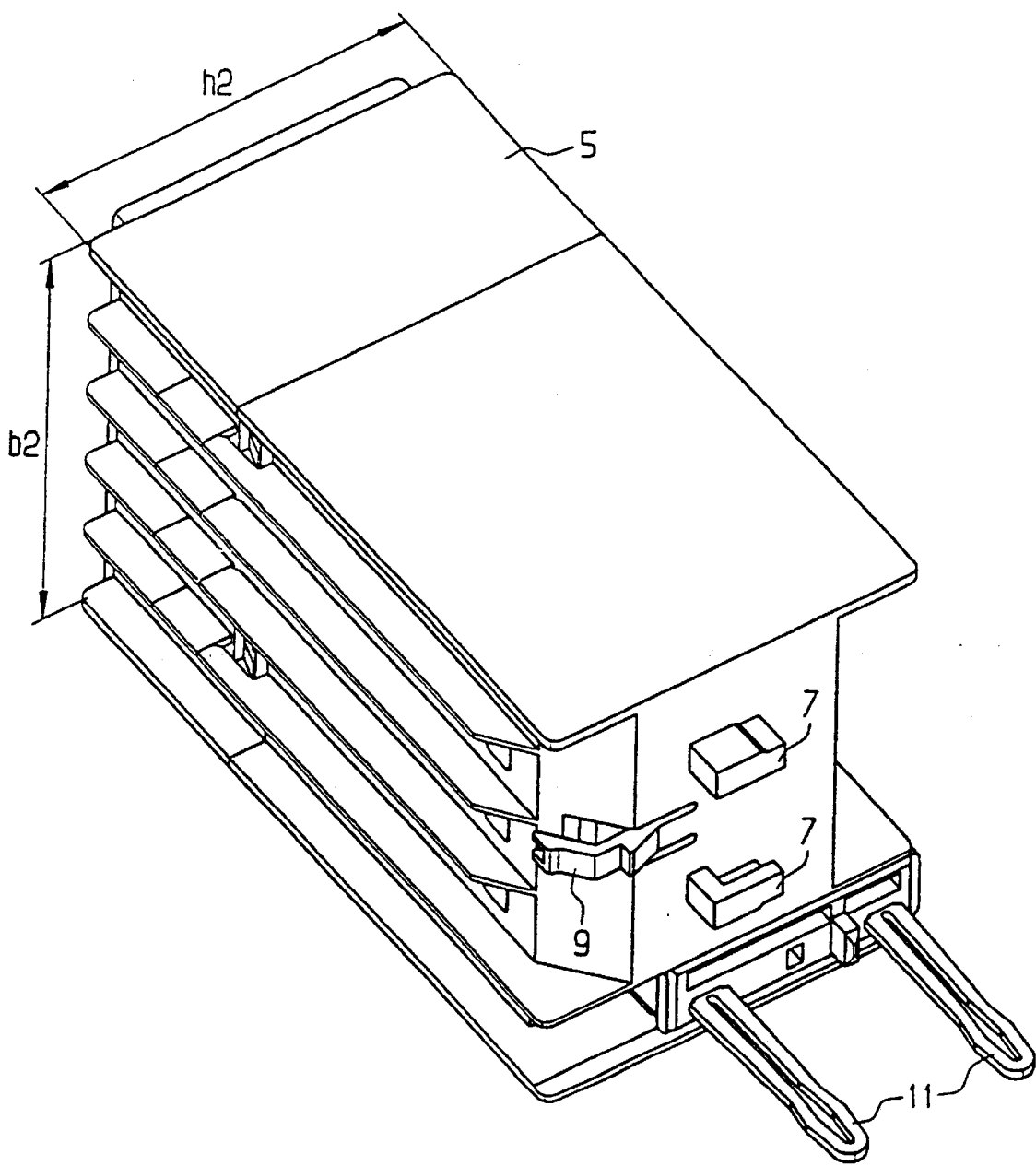
FIG. 2 shows a soft starter.

According to FIG. 2, a soft starter 5 includes a physical soft starter width b2 and a physical soft starter height h2.

According to an embodiment of FIGS. 1 and 2, the contactor 1 and the soft starter 5 include interacting hook elements 6, 7. The soft starter 5 can be held by using the hook elements 6, 7 when it is mounted on the contactor 1. The contactor 1 and the soft starter 5 furthermore can include interacting latching elements 8, 9.

The soft starter 5 can thus be mounted on the operating face 3 of the contactor 1 without any tools by hooking it in and automatic latching. When the latching element 9 on the soft-starter side is operated—for example by being operated by a finger or by applying a screwdriver blade—the soft starter 5 can be detached from the contactor 1 once again.

Figure 3:
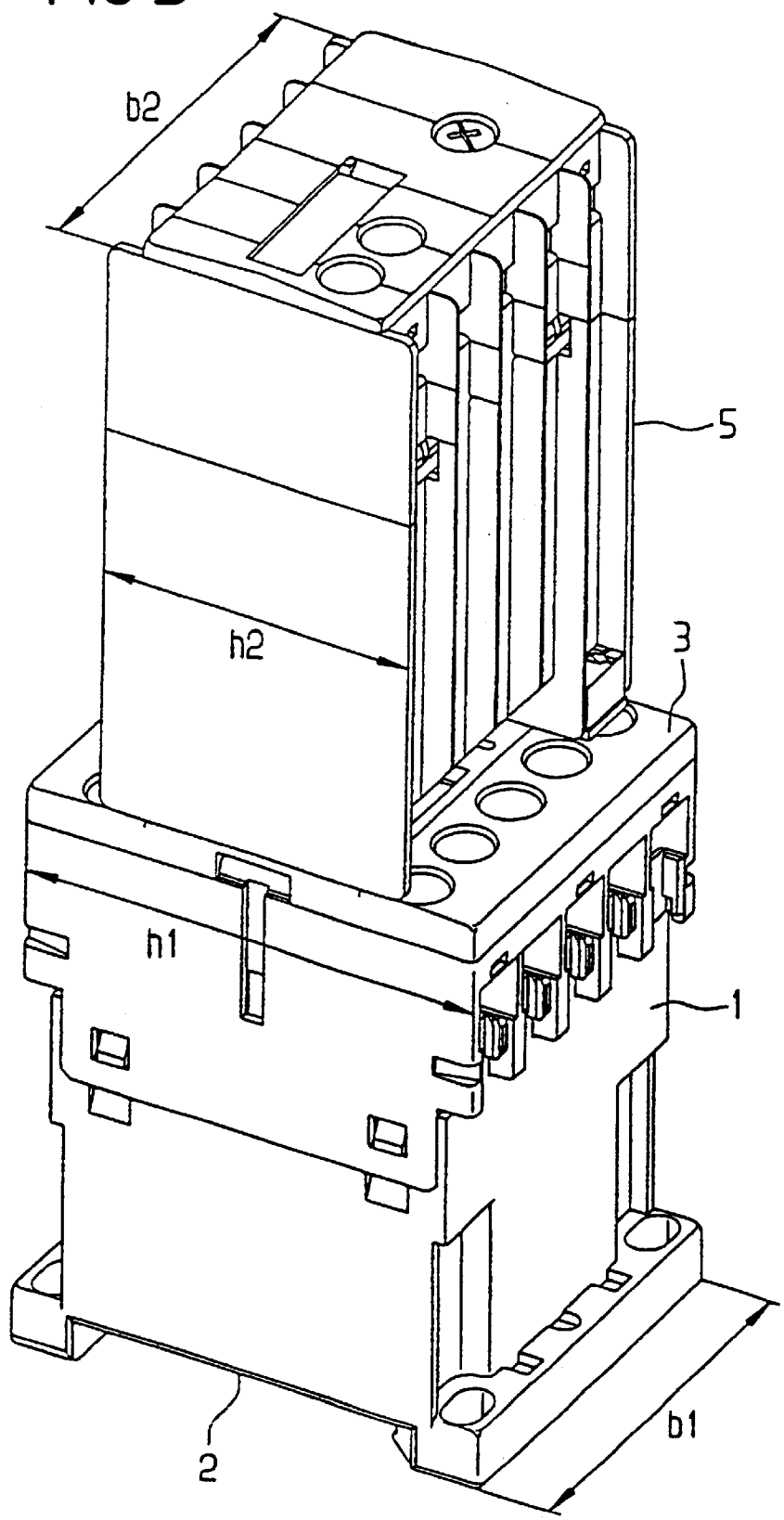
FIG. 3 shows a combination of a contactor and a soft starter.

A combination of the contactor 1 and the soft starter 5, in which combination the soft starter 5 is mounted on the contactor 1, is shown in an embodiment of FIG. 3. According to FIG. 3, the soft starter 5 is arranged on the operating face 3 of the contactor 1. As can be seen, the physical contactor height h1 can be greater than the physical soft starter height h2. It can also be seen that the physical contactor width b1 can be at least as great as the physical soft starter width b2.

The contactor 1 and the soft starter 5 further include interacting supply contact elements 10, 11, similar to FIGS. 1 and 2. The supply contact elements 10, 11 allow the soft starter 5 to be supplied with electrical power via the contactor 1.

Figure 4:
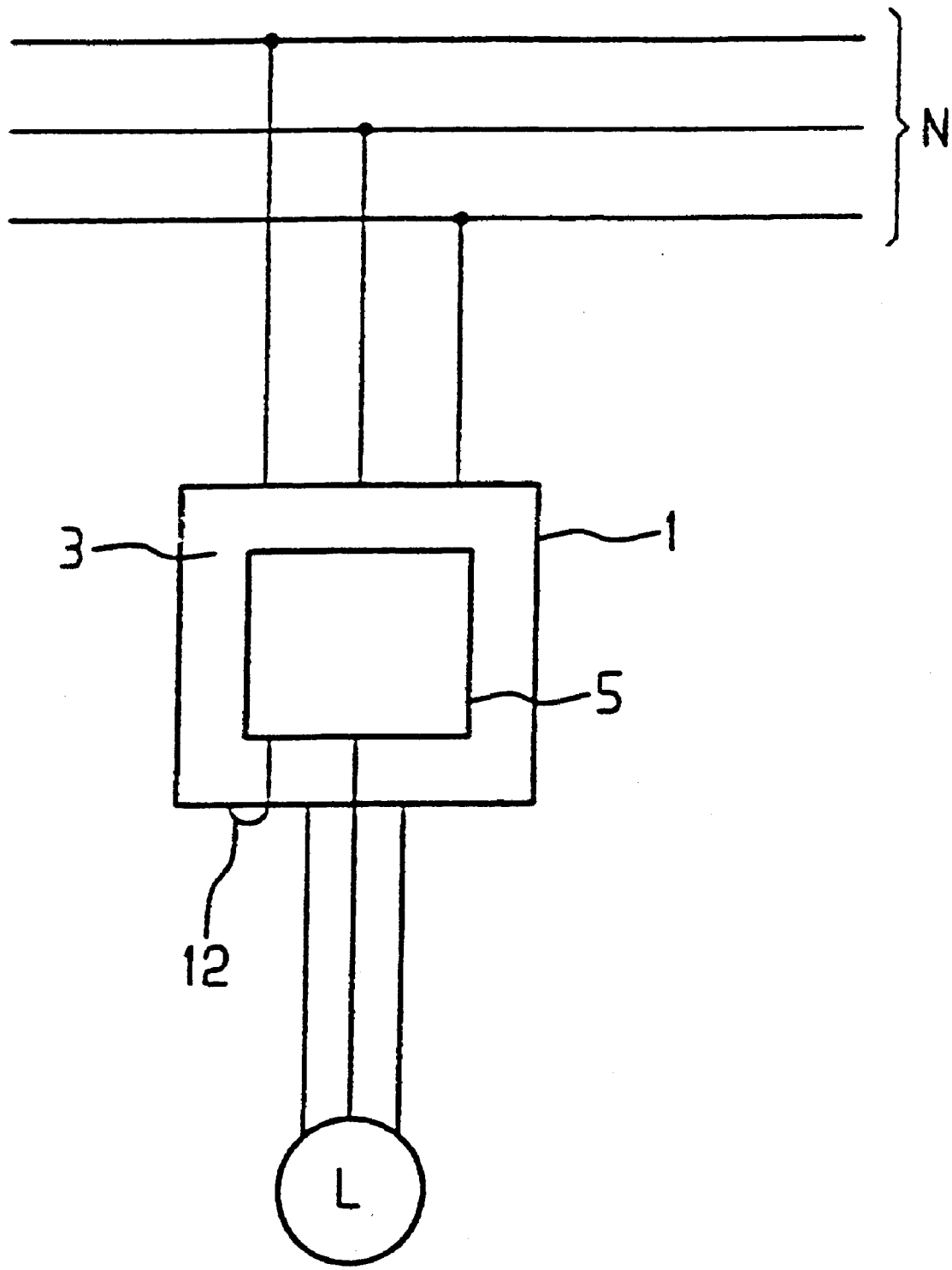
FIG. 4 shows a block diagram of a motor outgoer.

According to an embodiment of FIG. 4, the contactor 1 can connect a three-phase power supply system N to a three-phase load L. The soft starter 5 is a single-phase soft starter 5. It can thus influence only one phase of the three-phase power supply system N. According to an embodiment of FIG. 4, only the phase which can be influenced is connected via the soft starter 5 to the three-phase load L. The two other phases are connected directly via the contactor 1 to the three-phase load L. The number of cables that need be laid is thus less than in the prior art.

According to an embodiment of FIG. 4, the phase which can be influenced is connected via a connecting cable 12 from the contactor 1 to the soft starter 5. If necessary, this connecting cable 12 could also be saved by the contactor 1 and the soft starter 5 including interacting load contact elements, by which a load current cable for the phase which can be influenced is closed from the contactor 1 to the soft starter 5. If more than one phase can be influenced, interacting load contact elements must, of course, in this case be provided for each phase which can be influenced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combination, comprising:
   a contactor;
   a soft starter, wherein the soft starter is mounted on the contactor.

2. The combination as claimed in claim 1, wherein the contactor includes a mounting face and an operating face, opposite the mounting face, and wherein the contactor is mountable by the mounting face on a holding element, and wherein the soft starter is arranged on the operating face of the contactor.

3. The combination as claimed in claim 1, wherein the contactor and the soft starter include interacting hook elements, via which the soft starter is held on the contactor.

4. The combination as claimed in claim 1, wherein the contactor and the soft starter include interacting latching elements, permitting detachable connection between the soft starter and the contactor.

5. The combination as claimed in claim 1, wherein the contactor and the soft starter include interacting supply contact elements, via which the soft starter is suppliable with electrical power via the contactor.

6. The combination as claimed in claim 1, wherein the contactor and the soft starter include interacting load contact elements, via which at least one load current cable is connected from the contactor to the soft starter.

7. The combination as claimed in claim 1, wherein the contactor connects a three-phase power supply system to a three-phase load, wherein the soft starter is in the form of a single-phase soft starter, via which only one phase of the three-phase power supply system can be influenced, wherein the one phase which can be influenced is connected via the soft starter to the three-phase load, and wherein the two other phases are connected directly via the contactor to the three-phase load.

8. The combination as claimed in claim 1, wherein the contactor includes a physical contactor width, wherein the soft starter includes a physical soft starter width, and wherein the physical contactor width is at least as great as the physical soft starter width.

9. The combination as claimed in claim 1, wherein the contactor includes a physical contactor height, wherein the soft starter includes a physical soft starter height, and wherein the physical contactor height is greater than the physical soft starter height.

10. The combination as claimed in claim 2, wherein the contactor and the soft starter include interacting hook elements, via which the soft starter is held on the contactor.

11. The combination as claimed in claim 2, wherein the contactor and the soft starter include interacting latching elements, permitting detachable connection between the soft starter and the contactor.

12. The combination as claimed in claim 3, wherein the contactor and the soft starter include interacting latching elements, permitting detachable connection between the soft starter and the contactor.

13. The combination as claimed in claim 2, wherein the contactor and the soft starter include interacting supply contact elements, via which the soft starter is suppliable with electrical power via the contactor.

14. The combination as claimed in claim 2, wherein the contactor and the soft starter include interacting load contact elements, via which at least one load current cable is connected from the contactor to the soft starter.

15. The combination as claimed in claim 2, wherein the contactor connects a three-phase power supply system to a three-phase load, wherein the soft starter is in the form of a single-phase soft starter, via which only one phase of the three-phase power supply system can be influenced, in that that phase which can be influenced is connected via the soft starter to the three-phase load, and wherein the two other phases are connected directly via the contactor to the three-phase load.

16. The combination as claimed in claim 5, wherein the contactor connects a three-phase power supply system to a three-phase load, wherein the soft starter is in the form of a single-phase soft starter, via which only one phase of the three-phase power supply system can be influenced, in that that phase which can be influenced is connected via the soft starter to the three-phase load, and wherein the two other phases are connected directly via the contactor to the three-phase load.

17. The combination as claimed in claim 2, wherein the contactor includes a physical contactor width, wherein the soft starter includes a physical soft starter width, and wherein the physical contactor width is at least as great as the physical soft starter width.

18. The combination as claimed in claim 3, wherein the contactor includes a physical contactor width, wherein the soft starter includes a physical soft starter width, and wherein the physical contactor width is at least as great as the physical soft starter width.

19. The combination as claimed in claim 2, wherein the contactor includes a physical contactor height, wherein the soft starter includes a physical soft starter height, and wherein the physical contactor height is greater than the physical soft starter height.

20. The combination as claimed in claim 3, wherein the contactor includes a physical contactor height, wherein the soft starter includes a physical soft starter height, and wherein the physical contactor height is greater than the physical soft starter height.

* * * * *